United States Patent Office 3,790,596
Patented Feb. 5, 1974

3,790,596
METHOD OF PRODUCING INDOLE AND SUBSTITUTION PRODUCTS OF THE SAME
Nikolai Nikolaevich Suvorov, 3 ulitsa Frunzenskaya 6, kv. 172; Vladimir Grigorievich Avramenko, ulitsa Kondratyuka 14, kv. 50; Valentina Nikolaevna Shkilkova, 2 Pereyaslavsky pereulok 9, kv. 12; and Lidia Ionovna Zamyshlyaeva, Novolesnaya ulitsa 18, korpus 1, kv. 7, all of Moscow, U.S.S.R.
No Drawing. Continuation-in-part of abandoned application Ser. No. 712,361, Mar. 12, 1968. This application May 14, 1971, Ser. No. 143,644
Int. Cl. C07d 27/56
U.S. Cl. 260—319.1
8 Claims

ABSTRACT OF THE DISCLOSURE

A method of producing indole and its derivatives consisting in that an arylhydrazone having the general formula

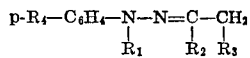

where $R_1$ and $R_2$ are hydrogen or methyl, $R_3$ is hydrogen or ethyl, and $R_4$ is hydrogen or chlorine, bromine, methyl or methoxy, is catalyzed in the vapor phase over aluminum oxide at a temperature of 300–400° C.

---

This is a continuation-in-part of Ser. No. 712,361, filed Mar. 12, 1968, now abandoned.

The present invention relates to methods of producing indole and its derivatives, and more particularly to indoles alkylated in the pyrrole ring and also substituted with an alkyl group in the 5th position of the benzene ring.

Indole proper and its derivatives may be used as a starting material in the manufacture of valuable preparations, such as heteroauxin, indolylbutyric acid, tryptophane, indopane, indomethacine and others.

An efficient industrial method for synthesizing indole has not been yet invented. The main source of indole is coal tar, but it contains indole in as little as 2–3 percent. The classical method of producing indole derivatives by Fisher's reaction does not ensure production of either indole as such or its derivatives non-substituted in the pyrrole ring. Despite a great variety of catalysts tried, numerous attempts to ensure effective cyclization proved ineffective (Sampter, Robinson, Syvorov and others).

In connection with the above considerations, various methods for synthesizing indole were proposed: from aniline with acetylene, from o-nitroethylbenzene, from aniline with ethyl alcohol, and some other materials.

Heterogeneous catalytic methods predominate in the numerous proposals, since they are most efficient and practically suitable in a continuous process of manufacture. However, none of them has found industrial application owing to small yields (not over 18–20 percent, and 27 percent in a single case only) and complexity of its crystallization and purification, since indole is prepared as a rule in the form of difficulty crystallizing oil.

The object of this invention is to carry out cyclization of various arylhydrazones to the appropriate indoles.

This object has been achieved by the provision of a method which according to the invention, resides in that arylhydrazones, having the general formula

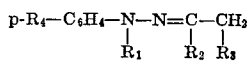

where $R_1$ and $R_2$ are hydrogen or methyl, $R_3$ is hydrogen or ethyl and $R_4$ is hydrogen, methyl, chlorine, bromine, methoxy, are catalyzed over aluminum oxide at a temperature of 300–400° C.

Arylhydrazones in the form of concentrated solutions in an organic solvent, such as benzene, or toluene, should be preferably introduced into the reaction zone.

The preferred medium for the process is that of an inert gas, e.g. carbon dioxide or nitrogen.

Cyclization is ensured with any quantity of catalyst, but the optimum quantity is 30–60 g. alumina per 100 g. starting product. The catalysts may be recovered by heating in a current of air at 600–650° C. for 4–5 hours and reused in the process. Fresh catalyst should also be heated in a flow of hot air (600–650° C.).

Both, phenylhydrazine base and phenylhydrazine hydrochloride may be used for producing phenylhydrazone acetaldehyde, the starting material for synthesizing indole.

Arylhydrazones obtained from p-substituted or N-substituted aniline are used for synthesizing 5- and 1-substituted indoles respectively.

The yield of indole in the process, according to the invention, is as high as 60 percent.

Several derivatives, as N-methyl, 5-methyl, 5-chloro- and 5-bromoindole may also be obtained in the process according to our invention, the yields being 15 percent, 42 percent, 48 percent and 10 percent respectively.

The raw materials, viz., phenylhydrazine hydrochloride, phenylhydrazine base, acetaldehyde and the starting products for synthesizing 4- and N-substituted phenyl hydrazones are commercial products in chemical industry.

Tentative calculations have shown that production of indole according to the proposed method must reduce the cost of pure indole by 2–2.5 times as compared with that of pure indole obtained from coal tar.

The invention will be better understood by those skilled in the art from the following examples given by way of illustration.

EXAMPLE 1

30 g. phenylhydrazone acetaldehyde is dissolved in 60 g. benzene and the solution is passed over 10 g. aluminum oxide in a catalytic oven at a temperature of 320–330° C. The rate of flow of the starting phenylhydrazone is $3.74 \times 10^{-3}$ mol/min. Carbon dioxide gas is passed simultaneously at a rate of 4–5 lit./hour.

The resultant grey-yellow catalyzate is dissolved in an equal volume of benzene and the solution is washed free of amines first with 5 percent sulfuric acid, then with 5 percent sodium bicarbonate solution and finally with water to neutral reaction to the all-purpose indicator. The benzene solution is evaporated in vacuum and thus indole is obtained in the form of a pale yellow oil which is crystallized on cooling. Further purification is ensured by vacuum distillation. Recrystallization from petroleum ether may also be used for purification of indole. The yield is 60 percent of the theory; melting point of the product is 52° C.

EXAMPLE 2

Prepartion of N-methylindole 30 g. N-methyl-N-phenylhydrazone acetaldehyde is dissolved in an equal weight of benzene and the solution is passed over the catalyst in the oven at a temperature of 325–330° C. The hydrazone flow-rates and the weight of the catalyst are the same as in Example 1. The obtained catalyzate is dissolved in two volumes of solvent and the solution is then washed with sulfuric acid, sodium bicarbonate and finally with water as in Example 1. After distillation of benzene, N-methylindole is obtained in the form of a pale yellow liquid, which after another distillation yields a pure product having a melting point of 80–82° C. The yield is 15 percent of theory.

EXAMPLE 3

Prepartion of 5-chloroindole 30 g. p-chlorophenylhydrazone acetaldehyde is dissolved in 5 parts by weight of benzene per one part by weight of the p-chlorophenylhydrazone acetaldehyde starting material and the solution is passed over 10 g. catalyst at a rate of $1.5 \times 10^{-3}$ mol/min. Carbon dioxide is passed simultaneously. The temperature of the catalyst is 325–330° C. The catalyzate is then treated as described in Example 1. The crude 5-chloroindole has a melting point of 40–44° C. It is purified by recrystallization from petroleum ether; the melting point of the resultant product is 69–70° C. The yield is 48 percent of theory.

EXAMPLE 4

Prepartion of 5-bromoindole p-Bromophenylhydrazone is catalyzed as described in Example 3. Treatment of the catalyzate is also completely similar to that described in the previous example.

The crude 5-bromoindole is purified by recrystallization from petroleum ether. The melting point of pure product is 85–86° C. The yield is 10 percent of theory.

EXAMPLE 5

Preparation of 5-methylindole p-Tolylhydrazone acetaldehyde is catalyzed as described in Example 3. The treatment of the catalyzate is also the same. Technical 5-methylindole, having a melting point of 41–43° C., is purified by recrystallization from petroleum ether. The melting point of the pure product is 60° C. The yield is 42% of theory.

EXAMPLE 6

Preparation of indole

Phenylhydrazone acetaldehyde is catalyzed in the conditions described in Example 1. Nitrogen is used as an inert gas.

The catalyzate is treated as described in Example 1.

The yield of indole is 47 percent. Melting point, 51–52° C.

EXAMPLE 7

Preparation of 2-methylindole 30 g. phenylhydrazone acetone in the form of a benzene solution is passed over the catalyst in the oven. The solute-to-solvent ratio, the amount of catalyst, the inert gas flow-rate and the temperature of the catalyst are as in Example 1. The initial treatment of the catalyzate is the same as in Example 1. The benzene solution washed free of amines and non-reacted hydrazone is evaporated in vacuum. The resultant 2-methylindole is a pale yellow oil which crystallizes on cooling. The melting point of the crude product is 50–53° C.; after recrystallization, 60–61° C.

The yield, calculated with reference to the reacted hydrazone, is 80–82 percent.

Non-reacted phenylhydrazone acetone is separated from aniline (by adding 20 percent solution of NaOH to a slightly alkaline reaction to the all-purpose indicator, by extraction with diethyl ether and subsequent distillation in vacuum of the residue after distillation of the solvent) and used for cyclization.

EXAMPLE 8

Preparation of 3-ethylindole

Phenylhydrazone of butyraldehyde is catalyzed as described in Example 1. Treatment of the catalyzate, including separation of the non-reacted phenylhydrazone, is similar to that described in Example 7.

The melting point of 3-ethylindole after recrystallization is 36–37° C. The yield, calculated with reference to the reacted phenylhydrazone, is 85 percent.

EXAMPLE 9

Preparation of 5-methoxy-2-methylindole p-Methoxyphenylhydrazone acetone is catalyzed under the conditions described in Example 3. The treatment of the catalyzate is also the same.

The melting point of 5-methoxy-2-methyl-indole after recrystallization from petroleum ether, 86° C. The yield, 51 percent of theory.

What is claimed is:

1. A method of producing indole and its derivatives which comprises passing an arylhydrazone having the formula

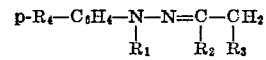

wherein $R_1$ and $R_2$ are selected from the group consisting of hydrogen and methyl, $R_3$ is selected from the group consisting of hydrogen and ethyl, and $R_4$ is selected from the group consisting of hydrogen, chlorine, bromine, methoxy and methyl in the vapor phase over a catalytically effective amount of aluminum oxide catalyst at a temperature of 300–400° C.

2. A method as claimed in claim 1, wherein the catalyst is preliminarily heated in a current of air at 600–650° C.

3. A method as claimed in claim 1, wherein the reaction is carried out in a flow of carbon dioxide gas.

4. A method as claimed in claim 1, wherein the reaction is carried out in a flow of nitrogen.

5. A method as claimed in claim 1, wherein arylhydrazones are introduced into the reaction zone in the form of a solution in an organic solvent.

6. A method as claimed in claim 1, wherein 30 to 60 weight parts of the catalyst are used per 100 weight parts of said arylhydrazone.

7. A method as claimed in claim 5 wherein the solvent is benzene.

8. A method as claimed in claim 1 wherein the arylhydrazone is passed over the catalyst at the rate of $1.5 \times 10^{-3}$ to $3.74 \times 10^{-3}$ mol/min.

References Cited

Sundberg: The Chemistry of Indole, pp. 148–49, 152–57, 209, 211.

JOSEPH A. NARCAVAGE, Primary Examiner

U.S. Cl. X.R.

260—326.16